Patented Sept. 6, 1949

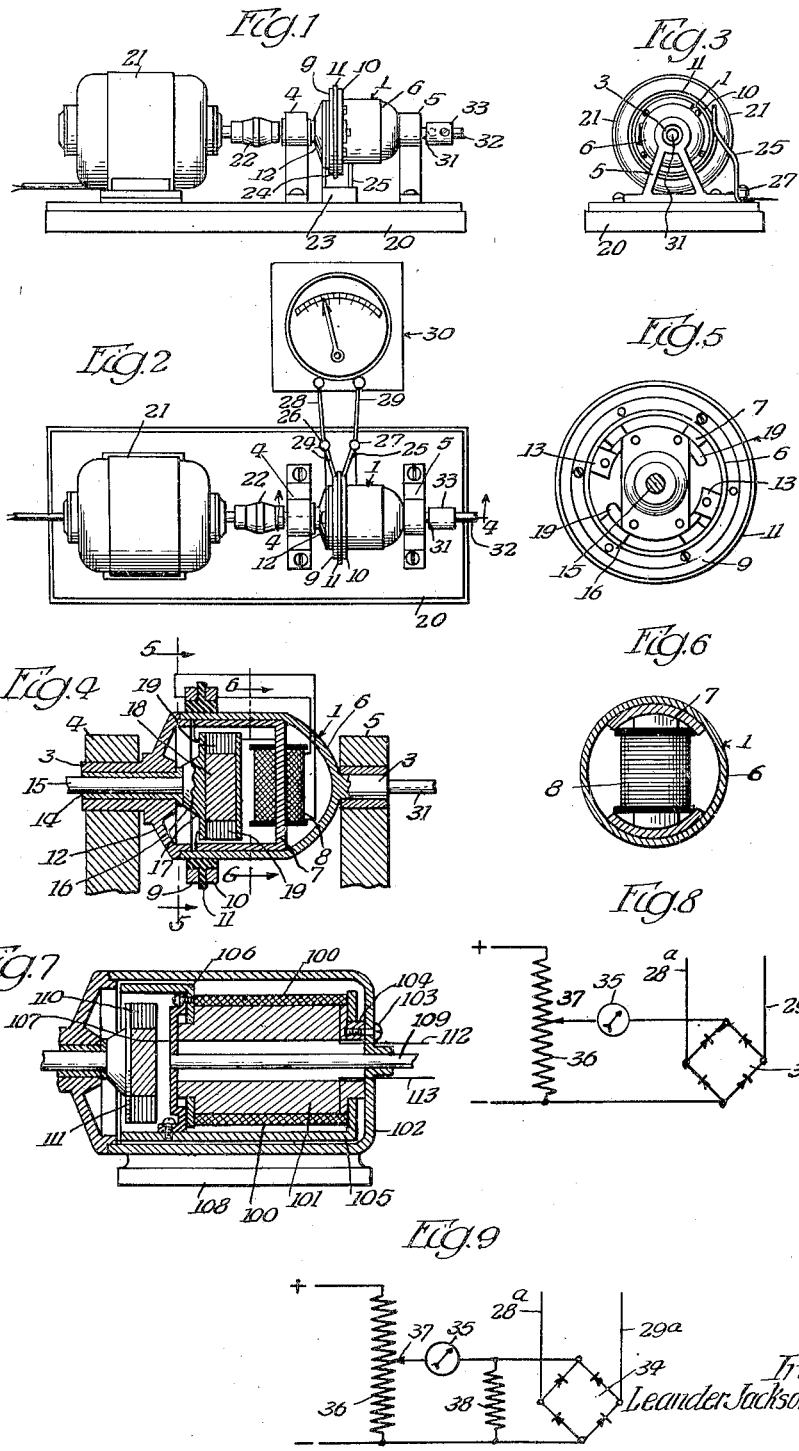

2,481,196

UNITED STATES PATENT OFFICE 2,481,196

SPEED RESPONSIVE DEVICE

Leander Jackson Bulliet, Rockford, Ill.

Application October 6, 1943, Serial No. 505,088

1 Claim. (Cl. 322—97)

This invention relates to speed responsive devices, or electrical tachometers. This application in part is a continuation of my application Serial No. 442,341, filed May 9, 1942, and now abandoned.

A common form of electrical tachometer comprising a generator and meter, is widely and successfully used where the rotative speed to be measured exceeds about two hundred revolutions per minute. At lower speeds, and particularly in the range below twenty-five revolutions per minute, the frequency of the voltage generated by the usual alternating current tachometer generator is so low that it cannot be read accurately on a voltmeter, nor can it be reliably used to actuate a control relay. Such a low frequency is, in reality, a slow succession of voltage bursts which show up on the meter as a series of wide needle swings which cannot be precisely read. This difficulty is not overcome by using a direct current generator because a generator of that type has discrete poles, and the pulses are still present. The low frequency difficulties inherent in the conventional tachometers are overcome in the present invention.

An important object of the present invention is to provide an apparatus of simple and inexpensive character to respond accurately and promptly to speeds of movement much lower than those to which conventional apparatus respond.

Another object of the invention is to provide an electrical speed responsive device whose electrical output is an alternating current, the frequency of which is high enough to actuate commercial electrical indicating and control equipment even when the device is driven at a very low speed.

A further object of the invention is to provide an electrical tachometer which will indicate accurately rotative speeds far below those which are capable of being indicated by conventional tachometers.

Numerous other objects and advantages will be apparent throughout the progress of the following specification.

The accompanying drawing illustrates a selected embodiment of the present invention and the views therein are as follows:

Fig. 1 is a detail elevational view of the improved responsive device embodying the present invention;

Fig. 2 is a detail plan view thereof;

Fig. 3 is a detail end view looking at the right end of Fig. 1;

Fig. 4 is a detail sectional view taken substantially along the line 4—4 of Fig. 2;

Fig. 5 is a detail sectional view taken substantially along the line 5—5 of Fig. 4;

Fig. 6 is a detail sectional view taken substantially along the line 6—6 of Fig. 4;

Fig. 7 is a detail sectional view of a modified form of generator adapted for use with the present speed responsive device;

Fig. 8 is a circuit diagram showing a modified form of metering arrangement for measuring the output of the generator; and Fig. 9 is a circuit diagram showing another modified form of metering arrangement for measuring the output of the generator.

The particular speed responsive device herein shown for the purpose of illustrating the invention may comprise an alternating current generator 1, of any well known type. Axially extending journals 2 and 3, Fig. 4, are receivable in upright supports 4 and 5 to provide suitable bearings for the journals. These journals or shafts 2 and 3 extend outwardly from the housing 6, and cap 12.

The housing 6 contains and supports a core structure 7 of ferro-magnetic material. A coil 8 is wound around the core structure 7 and is supported thereby. The ends of the winding of coil 8 are permanently connected, respectively, to slip rings 9 and 10 which are supported and electrically separated by the insulating ring 11.

A cap 12 fits on the housing 6 and is secured thereto by screws threaded into the lugs 13. The cap 12 is bored to receive a bearing 14 for the rotor shaft 15 which carries a rotor 16 consisting of a bracket 17, a permanent magnet 18 and two soft iron pole pieces 19, 19. An alternating voltage is generated in the coil 8 and appears at the slip rings 9 and 10, when the rotor 16 is turned by its shaft 15 relative to the pole structure 7.

The upright supports 4 and 5 may be secured to a base 20 which also supports a constant speed driving device 21. This speed driving device is preferably an alternating current synchronous motor supplied by alternating current of constant frequency. The shaft of device or motor 21 is coupled through a flexible coupling 22 to the rotor shaft 15 of the generator 1.

The base 20 also supports an insulating block 23 to which collector brushes 24 and 25 and binding posts 26 and 27 are secured. The brushes 24 and 25 bear upon the slip rings 9 and 10, and these brushes serve to conduct such voltage as may be present between the slip rings to binding posts 26 and 27. Conductors 28 and 29 connect the binding posts to a measuring instrument 30 which may be a voltmeter of any conventional construction and suitable range.

A shaft 31 extends beyond the journal 3 for the purpose of turning bodily the housing 6 and cap 12. This shaft 31 is adapted to be coupled to a rotating member such as a shaft 32, the speed of which is to be measured. The shaft 32, whose speed is to be determined, is shown coupled to the shaft 31 by a suitable coupling 33.

As an example to illustrate the operation of the device, let it be assumed that the parts are disposed as just described and the motor 21 is running at a predetermined constant speed, and that the input shaft 31, and hence the housing 6, is not rotating. The rotor 16 of the generator therefore, is driven, at motor speed by the motor 21, by the rotor shaft 15. The rotation of the rotor between the ends of the stationary core structure 7 will then generate a voltage in the coil 8 which will be conducted by the slip rings 9 and 10, the brushes 24 and 25, the binding posts 26 and 27 and the conductors 28 and 29 to the voltmeter 30. The needle of the voltmeter 30 then will show a deflection. Since the motor speed is constant, the generated voltage, and hence the voltmeter deflection, will remain constant so long as the housing is not turned. The speed of the motor 21 is so chosen that the frequency of the "datum voltage" is well within the frequency range which the meter 30 will accommodate. For convenience, the voltage generated with the housing 6 stationary will hereinafter be referred to as the "datum voltage" and the corresponding meter needle deflection will be called the "datum deflection."

When the input shaft 31 is rotated by the member 32, the housing 6 and the cap 12 will rotate and carry the core structure 7 with them. If such rotation is in a direction to increase relative rotary speed between the generator rotor and the core structure, the resulting generated voltage will then be greater than the "datum voltage" and the deflection of the needle in the meter 30 will be greater than the "datum deflection." Conversely, if the input shaft 31 is rotated in the opposite direction, the voltmeter deflection will be less than the "datum deflection." Thus, the amount by which the needle on the voltmeter 30 departs from its "datum deflection" is a measure of the rotary speed of the input shaft 31. The speed of the motor 21 is such as to produce the "datum voltage" at a frequency well removed from both limits of the frequency accommodation range of the voltmeter 30. Thus the relatively small increase or decrease of frequency of the generated voltage, caused by slow rotation of the shaft 31, does not affect the accuracy of the meter reading. The slowest speed that may be detected by this device is a matter of meter sensitivity and is not at all a question of generated frequency as is the case with the usual generating tachometers. Obviously, any suitable meter may be substituted for the indicating voltmeter 30, and if a permanent record is desired, a recording meter may be used.

The conductors 28 and 29 may be connected to marginal relays or contact making voltmeters or other voltage sensitive control devices if it is desired to initiate control functions in response to predetermined speeds of the shaft 32.

Where the speed to be measured is so low that the departure from the "datum voltage" is too small to observe conveniently or record on a meter with sufficient voltage range to accept the "datum voltage," it is desirable to measure the output of the generator by a suitable "suppressed zero" instrument or circuit. A "suppressed zero" voltmeter indicates only the amount of voltage above a predetermined voltage and spreads this departure over a wide range of scale values.

One "suppressed zero" device which may be used, is shown in Fig. 8, wherein the conductors 28a and 29a correspond, respectively, to the conductors 28 and 29 of Fig. 2 and serve to conduct the electrical output of the generator to the alternating current input of the rectifier 34. The direct current output of the rectifier 34 is connected in series with a suitable current measuring instrument 35, and then across an adjustable portion of the potentiometer coil 36. A constant direct current voltage, somewhat greater than the "datum voltage" of the tachometer generator, is impressed across the entire coil 36. With the motor 21 running, and the input shaft 31 stationary, the potentiometer slider 37 may be adjusted for zero reading of the instrument 35. If the input shaft 31 is now turned in such direction as to increase the generated voltage, the instrument 35 will show a deflection which is a measure of the departure from the "datum voltage" which is, as explained previously, a measure of the rotational speed of shaft 31.

If the slider 37 is adjusted for some reading of the instrument 35 other than zero, with "datum voltage" impressed, then rotations of the shaft in a direction to reduce generated voltage may be read as a reduction of needle deflection.

The instrument 35 may be very sensitive since it does not have to accommodate the "datum voltage." Thus very low speed may be indicated by large needle deflections. Here again, a sensitive recording instrument may replace the indicating instrument, or sensitive relays may be used to give controlling response to very slow movement.

In actual practice it has sometimes been advisable to use an alternative form of "suppressed zero" device, shown in Figure 9, wherein a fixed resistance 38 is connected across the output of the rectifier 34 illustrated in Figure 8. With the motor 21 running and the input shaft 31 stationary, the use of the fixed resistance 38 permits the attainment of a nearly absolute zero reading of the instrument 35 upon adjustment of potentiometer slider 37; whereas in the "suppressed zero" device shown in Fig. 8 the zero reading which may be reached is approximate only.

While slip rings may be made very reliable, it is desirable to eliminate them where possible. In Fig. 7 there is shown a modified form of tachometer generator which can be used in connection with the present invention, there being no need for sliding electrical connections.

A coil 100, Fig. 7, is wound upon a spool 101 of soft iron, which is rigidly attached to the stationary housing 102 as by screws 103. A reduced portion 104 of the spool 101 is received through a hole in a rotatable pole piece 105 and forms a bearing and support for the right hand end of the pole piece. Another pole piece 106 has a hole which slips over a reduced portion 104 at the other end of the spool 101. The two pole pieces 105 and 106 are mechanically united by a non-magnetic bracket 107. Thus, the two pole pieces 105 and 106 and the bracket 107 form a rotating member which rotates about the axis of the generator and is supported by the spool 101 which in turn is supported by the housing 102 on the base 108. An input shaft 109 extends through a bearing in the right end of the housing 102 and this shaft is secured rigidly to the bracket 107. Turning of the shaft 109 will rotate the pole faces about the axis of the generator. The left ends of the pole pieces 105 and 106 embrace the rotor pole pieces 110 and 111.

The coil in the modified generator shown in Fig. 7 is stationary so that the coil leads 112 and 113 can be permanently connected to the voltmeter 30, or other measuring or control device, without the need for sliding connections. The magnetic circuit passes longitudinally through the spool 101 between the pole pieces 105 and 106.

The invention provides an indicating, recording or controlling tachometer which is capable of measuring very low speeds. The sensitivity is such that such low speeds are indicated upon a long range meter scale so that very accurate readings may be made. The device comprises a small number of simple parts which may be manufactured at low cost and assembled readily into a compact and conveniently handled unit.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

An electric tachometer comprising a support, a permanent magnet providing a pair of opposed poles, a core having a pair of arms forming pole pieces for cooperation with the poles of said magnet to form a magnetic circuit comprising said magnet and said core, means including a shaft drivingly connected with and supporting said permanent magnet for rotation, between said pole pieces, on an axis extending medially between said poles and said pole pieces, means including a shaft drivingly connected with and supporting said core for rotation on said axis and about said magnet, said shafts being in coaxial alignment, a bearing mounted on said support for carrying the shaft driving the permanent magnet, a second bearing mounted on said support for carrying said second mentioned shaft, a conductor coil inductively coupled with said core, means to drive one of said shafts at a shaft speed to be measured, means to drive the other shaft at a constant speed rate substantially higher than the shaft speed to be measured, whereby to generate an alternating voltage in said coil proportional to the speed difference of said shafts, and voltage suppressing means connected with said conductor coil and providing, for all shaft speeds, a proportional reduction of said voltage for application on a voltage meter having an operating range less than the average voltage generated in said coil during operation.

LEANDER JACKSON BULLIET.

REFERENCES CITED

The following references are of record in the file of this patent:

UNITED STATES PATENTS

| Number | Name | Date |
| --- | --- | --- |
| 634,937 | Buck | Oct. 17, 1899 |
| 1,751,538 | Wunsch | Mar. 25, 1930 |
| 2,217,856 | Brady | Oct. 15, 1940 |
| 2,232,751 | Wilson | Feb. 25, 1941 |
| 2,285,463 | Ridgeway | June 9, 1942 |
| 2,301,115 | Gilbert | Nov. 3, 1942 |
| 2,325,401 | Hurlston | July 27, 1943 |
| 2,376,421 | Drake | May 22, 1945 |

FOREIGN PATENTS

| Number | Country | Date |
| --- | --- | --- |
| 58,796 | Sweden | Nov. 2, 1920 |
| 486,101 | Great Britain | Aug. 27, 1936 |